United States Patent
Marten

(10) Patent No.: US 7,580,030 B2
(45) Date of Patent: Aug. 25, 2009

(54) SENSOR FOR CAPACITIVE TOUCH PAD POINTING DEVICE

(75) Inventor: Victor Marten, Flushing, NY (US)

(73) Assignee: Semtech Corporation, Camarillo, CA (US)

( * ) Notice: Subject to any disclaimer, the term of this patent is extended or adjusted under 35 U.S.C. 154(b) by 364 days.

(21) Appl. No.: 10/528,512

(22) PCT Filed: Jun. 10, 2004

(86) PCT No.: PCT/IB2004/050880

§ 371 (c)(1),
(2), (4) Date: Mar. 18, 2005

(87) PCT Pub. No.: WO2004/112448

PCT Pub. Date: Dec. 23, 2004

(65) Prior Publication Data

US 2005/0270273 A1    Dec. 8, 2005

Related U.S. Application Data

(60) Provisional application No. 60/320,276, filed on Jun. 13, 2003.

(51) Int. Cl.
*G06G 3/41* (2006.01)
(52) U.S. Cl. .................................. 345/173; 345/178
(58) Field of Classification Search ......... 345/173–183,
345/161, 156–163, 204; 178/18.01–18.08,
178/19.01–19.04; 714/734, 742; 310/331,
310/328; 264/40.5, 40.1, 299, 320; 73/780
See application file for complete search history.

(56) References Cited

U.S. PATENT DOCUMENTS

| | | | | |
|---|---|---|---|---|
| 3,668,313 A * | 6/1972 | Dym ........................ | 178/18.05 |
| 3,806,912 A * | 4/1974 | Eckert ............................ | 341/5 |
| 4,071,785 A * | 1/1978 | Yoshida et al. .............. | 310/331 |
| 4,334,239 A * | 6/1982 | Herbst et al. ................. | 348/274 |
| 4,475,235 A * | 10/1984 | Graham ...................... | 382/121 |
| 4,743,895 A * | 5/1988 | Alexander ................... | 345/174 |
| 4,855,550 A * | 8/1989 | Schultz, Jr. ................. | 200/600 |
| 5,194,852 A * | 3/1993 | More et al. .................. | 345/182 |
| 5,543,589 A | 8/1996 | Buchana et al. | |
| 5,953,199 A * | 9/1999 | Owens ........................ | 361/212 |
| 6,115,030 A * | 9/2000 | Berstis et al. ............... | 345/161 |
| 6,211,606 B1 * | 4/2001 | Kanda et al. ................. | 310/328 |
| 6,222,528 B1 * | 4/2001 | Gerpheide et al. ........... | 345/173 |
| 6,294,113 B1 * | 9/2001 | Woodmansee et al. ..... | 264/40.5 |
| 6,392,636 B1 * | 5/2002 | Ferrari et al. ................ | 345/173 |
| 6,478,565 B2 * | 11/2002 | Woodmansee et al. ...... | 425/149 |

(Continued)

FOREIGN PATENT DOCUMENTS

JP    61-163525    *    7/1986

OTHER PUBLICATIONS

NN8905367 IBM Technical Disclosure Bulletin, US Pressure-Sensitive Cursor Control Keypads; vol. 31, Issue No. 12, pp. 367-370, Cross Reference: 0018-8689-31-12-367 Publication-Date: May 1, 1989.*

*Primary Examiner*—Prabodh M Dharia
(74) *Attorney, Agent, or Firm*—Oppedahl Patent Law Firm LLC

(57) ABSTRACT

The topology and the shape of sensing electrodes (4, 31) on the Capacity Touch Pad Sensor that allow sensing of small targets are disclosed. Sensor construction utilizes common PCB manufacture technique.

29 Claims, 5 Drawing Sheets

Composition of the PCB for the Capacitive Touch Pad Sensor

U.S. PATENT DOCUMENTS

| | | |
|---|---|---|
| 6,504,530 B1 | 1/2003 | Wilson et al. |
| 6,762,753 B2* | 7/2004 | Satoh et al. ................. 345/177 |
| 6,911,973 B2* | 6/2005 | Katsuki et al. ............. 345/177 |
| 7,075,523 B2* | 7/2006 | Marten et al. ............... 345/173 |
| 7,102,520 B2* | 9/2006 | Liu et al. .................. 340/572.1 |
| 7,131,047 B2* | 10/2006 | Welbon et al. .............. 714/734 |
| 7,230,612 B2* | 6/2007 | Sano et al. .................. 345/177 |
| 7,483,731 B2* | 1/2009 | Hoarau et al. ............... 600/344 |
| 7,499,040 B2* | 3/2009 | Zadesky et al. ............. 345/204 |
| 2001/0022406 A1* | 9/2001 | Woodmansee et al. ...... 264/40.5 |
| 2003/0234773 A1* | 12/2003 | Sano et al. .................. 345/177 |
| 2004/0175257 A1* | 9/2004 | Pallas .................... 414/222.02 |
| 2004/0178997 A1* | 9/2004 | Gillespie et al. ............ 345/173 |
| 2004/0199844 A1* | 10/2004 | Welbon et al. .............. 714/742 |
| 2005/0005703 A1* | 1/2005 | Saito et al. .................... 73/780 |
| 2006/0038792 A1* | 2/2006 | Sano et al. .................. 345/173 |
| 2007/0008299 A1* | 1/2007 | Hristov ....................... 345/173 |
| 2007/0086273 A1* | 4/2007 | Polany et al. ............... 367/131 |

* cited by examiner

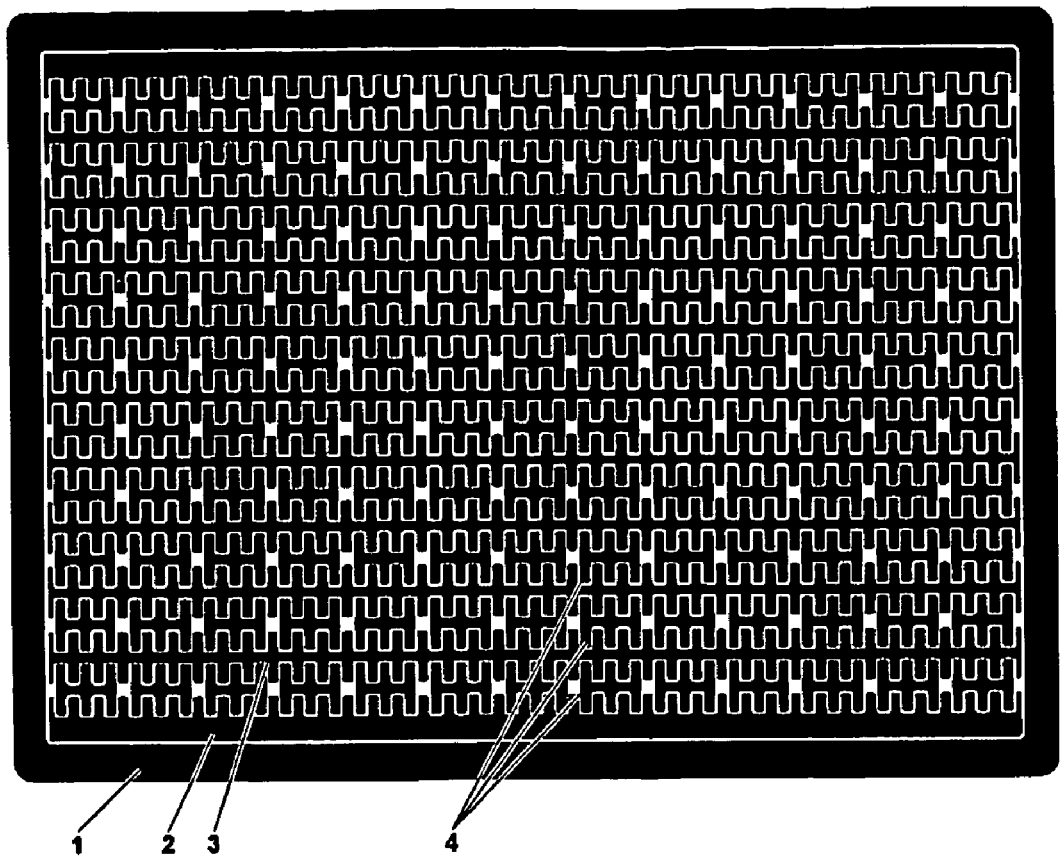
*Figure 1.* Artwork for the First (Top) Copper Layer

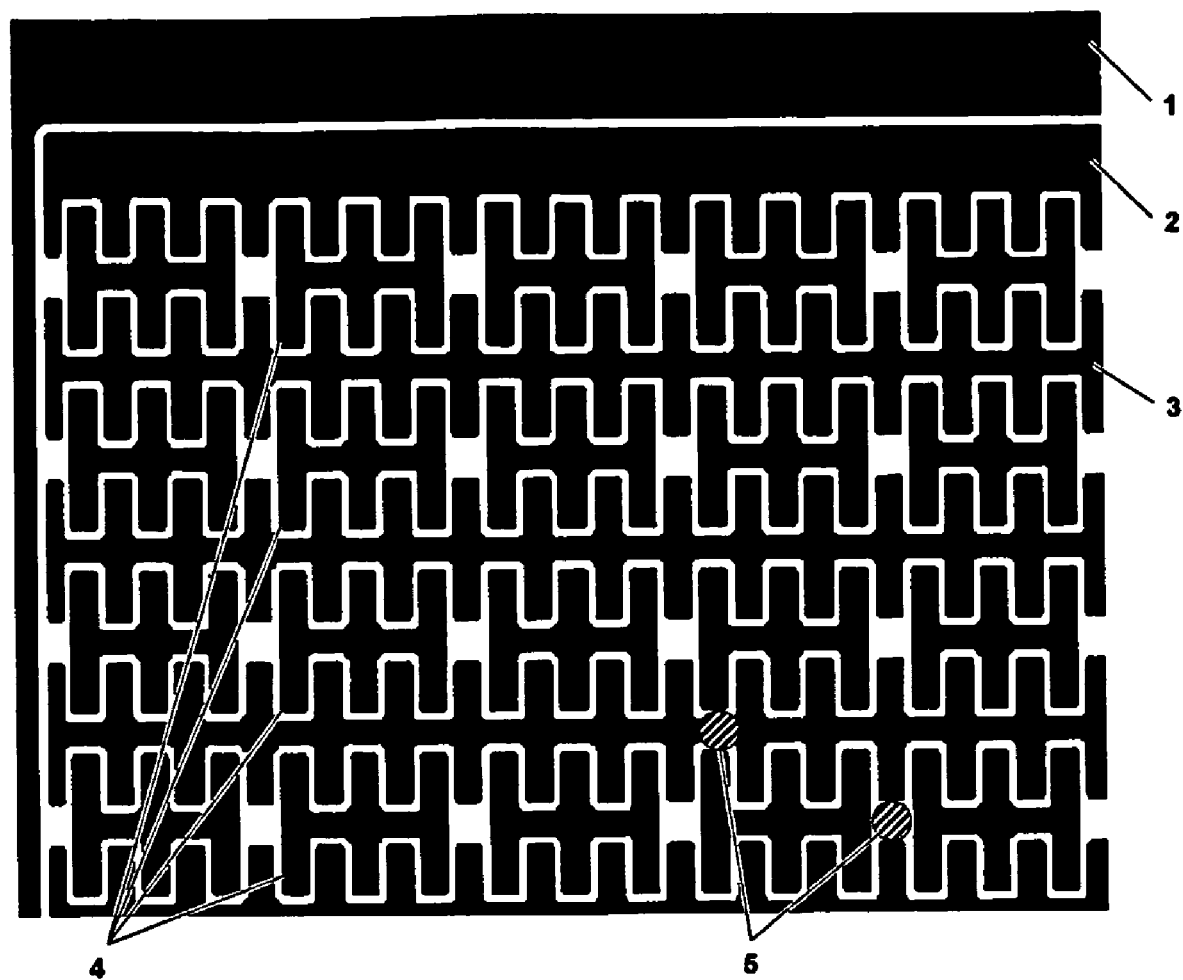
*Figure 2.* Fragment of Magnified Artwork for the First (Top) Copper Layer

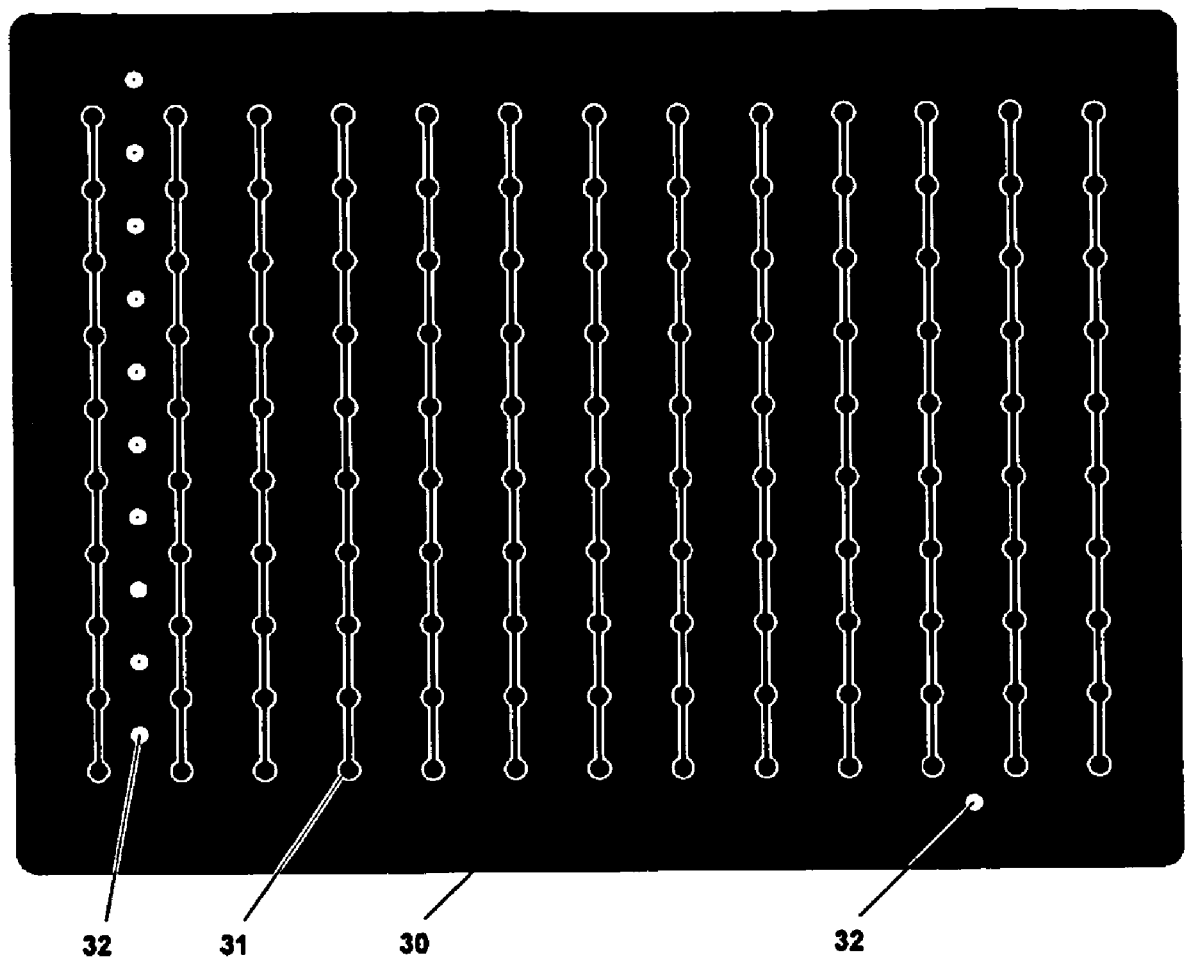
Figure 3. Artwork for the Second (Internal) Copper Layer

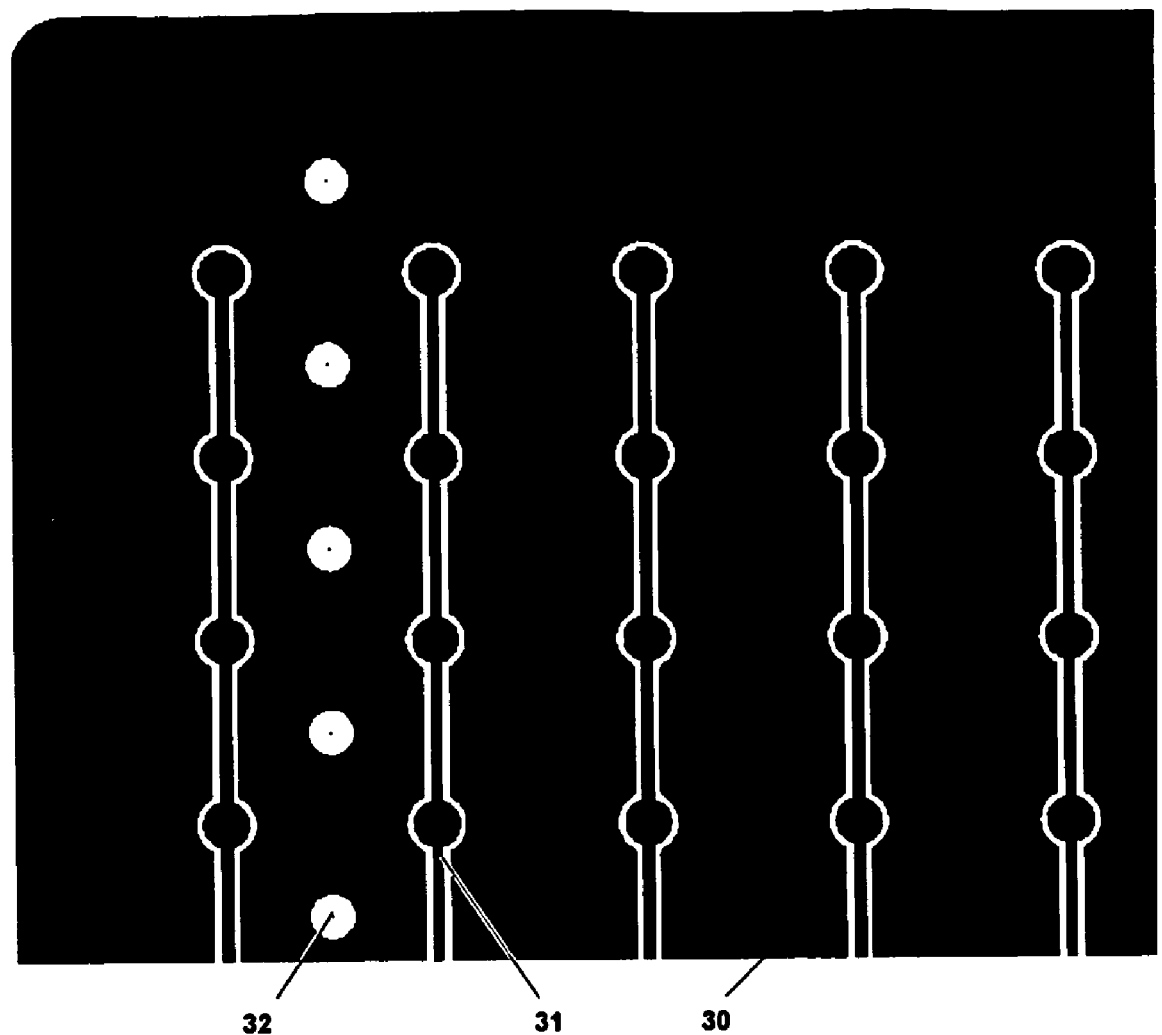
*Figure 4.* Fragment of Magnified Artwork for the Second (Internal) Copper Layer

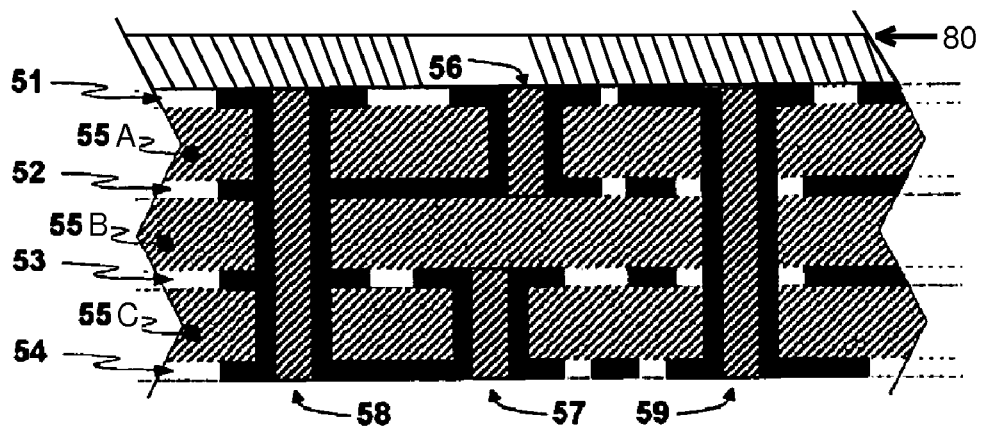
Figure 5. Composition of the PCB for the Capacitive Touch Pad Sensor
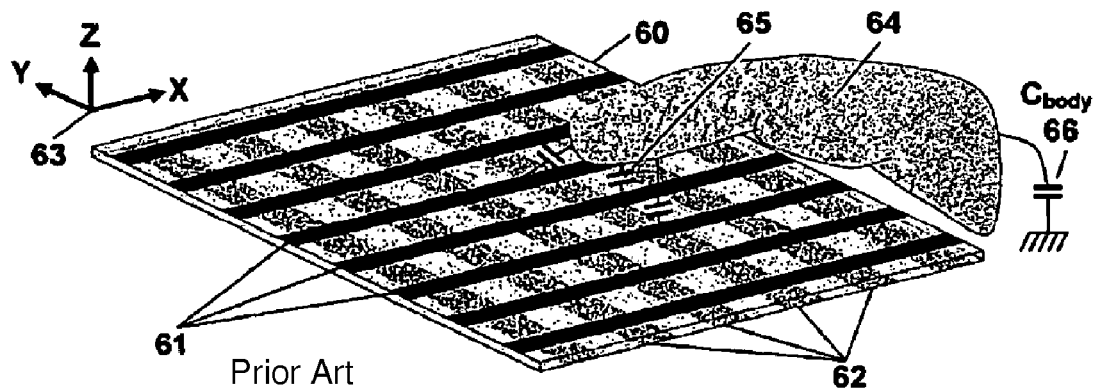
Figure 6. Conceptual Capacitive Touch Pad Sensor
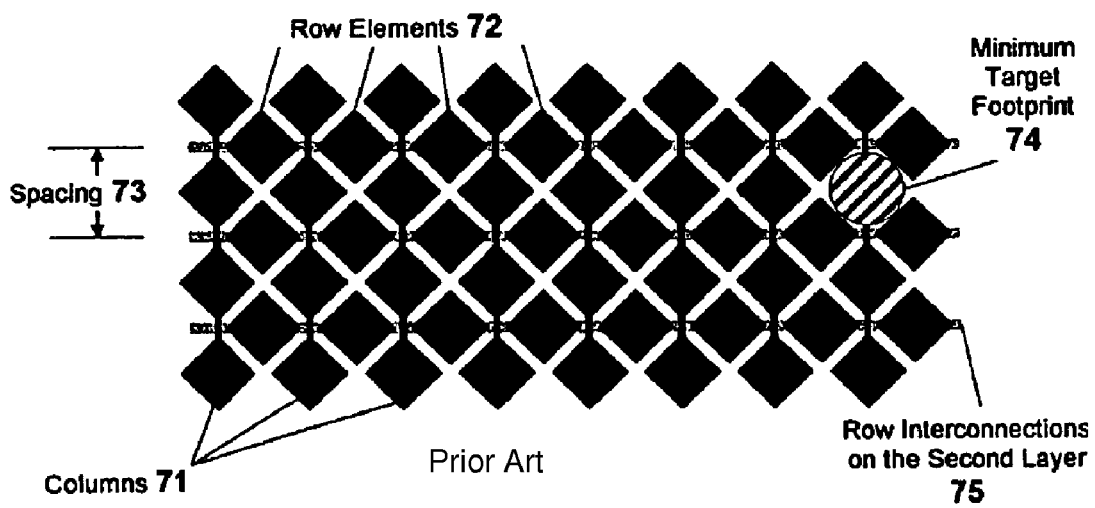
Figure 7. Previous Art

SENSOR FOR CAPACITIVE TOUCH PAD POINTING DEVICE

This application claims priority from U.S. application. No. 60/320,276 filed Jun. 13, 2003, which application is hereby incorporated herein by reference for all purposes.

BACKGROUND ART

Modern computing devices typically utilize some form of pointing device for interactions of the user(s) with the Operating System (OS) or Graphical User Interface (GUI). The Capacitive Touch Pad (CTP) is well established as the pointing device of choice for Laptop and Notebook portable computers, and other devices.

A Conceptual Capacitive Touch Pad 60 is demonstrated in FIG. 6. A non-conductive cover that provides galvanic isolation between the user's hand and the Sensor is omitted for clarity here and in FIGS. 1 through 4.

Two groups of electrodes 61 and 62 are utilized. Group 61, with electrodes parallel to the X-axis, is used for determination of the Y coordinate (according to the system of coordinates depicted as 63). Group of electrodes 62, with electrodes parallel to the Y-axis, is used for determination of the X coordinate. When digit 64 is located on or near the surface of the Sensor, the capacitances 65 between the digit 64 and electrodes belonging to group 61 (as illustrated in FIG. 6) allow for the determination of the position of the digit 64 in the Y-axis. The capacitances between the digit 64 and group of electrodes 62 (not shown for clarity) allow the determination of the position in the X-axis. It should be noted that the user's body does not need a galvanic contact to ground, and parasitic body capacitance 66 to ground is sufficient for reliable operations, as it is typically several orders of magnitude larger than the capacitances 65.

It will be appreciated by a person skilled in the art, that the topology of the electrodes and their exact shape and position will greatly affect the operations of the Capacitive Touch Pad. The capacitances 65 are directly proportional to the area of contact (footprint) between the digit 64 and groups of electrodes 61 and 62. Therefore, it is desired that the areas of the electrodes on the surface of the Sensor be as great as possible.

One possible approach utilized in the Prior Art devices is shown in FIG. 7. There, the diamond-shaped elements are interconnected into Rows and Columns. The Columns 71 are created by connecting the elements by a trace on the same top layer. The Row elements 72 are joined together by traces 75 on a second layer. The Row element may have galvanic connections, through vias between the layers, or may be capacitively coupled to the traces 75. The distance between the Rows is illustrated as Spacing 73.

It should be self-evident that if a user touches the pad generating a footprint 74 with diameter less than the spacing 73 and positioned as shown, the footprint will not register on the Rows at all.

In the Prior Art implementations, the ability to sense the small targets is achieved by increasing the number of Rows and Columns. However, this approach necessitates a corresponding increase in the number of signal lines on the sensing and controlling circuit, often implemented as a single Solid-State Integrated Circuit (IC) or a group of ICs, with corresponding increase in costs.

It is much more preferable to achieve the objective of small target sensing by some other means, rather than the brute-force approach of employing a simple increase of the number of the sensing electrodes.

SUMMARY OF INVENTION

The current invention teaches the topology and shape of sensing electrodes on the Capacitive Touch Pad Sensor that allow sensing of small targets. One specific implementation shown in FIGS. 1 through 4 provides for a 5× improvement for the size of the minimum footprint necessary for operations of the Capacitive Touch Pad. This implementation uses a common PCB (printed circuit board) manufacturing process without the requirement of super-fine lines and spacings, and without a need for very-small holes and vias.

BRIEF DESCRIPTION OF DRAWINGS

FIG. 1 shows the Artwork for the First (Top) Copper Layer.

FIG. 2 depicts a Fragment of the Magnified Artwork for the First (Top) Copper Layer.

FIG. 3 shows the Artwork for the Second (Internal) Copper Layer.

FIG. 4 demonstrates a Fragment of the Magnified Artwork for the Second (Internal) Copper Layer.

FIG. 5 shows the Composition of the PCB for the Capacitive Touch Pad Sensor.

FIG. 6 illustrates a Conceptual Capacitive Touch Pad Sensor.

FIG. 7 explains Previous Art implementation of a Capacitive Touch Pad Sensor.

DETAILED DESCRIPTION

It is desirable for Rows to occupy the whole top area of the Capacitive Touch Pad, with only small isolation gaps between individual Rows, when the measurements of the Y-axis are made; and for the Columns to occupy the whole top area of the Capacitive Touch Pad when the measurements of the X-axis are made. However, it is not practical, since the top area must be shared. The current invention allows for the Rows and Columns to have minimal gaps of coverage as compared to the Prior Art implementations.

Referring to FIG. 1 and FIG. 2, the Rows 3 are created by utilizing a "double-comb" pattern. It is desirable to have as many "fingers" as possible per unit of length, however the limitations of the manufacturing process impose a bound upon the minimum feature size, both for the copper conductors and for the spaces between them. The Sensor illustrated in FIGS. 1 through 4 can be produced with a standard low-cost PCB process often called "8/8", meaning that both the minimum well defined copper conductors and the spaces between them are 8 mils (0.008" or 0.2 mm). A person skilled in the art will immediately recognize that if the Capacitive Touch Pad is required to operate with even smaller target footprints, a finer PCB processing method could be used, resulting in larger number of "fingers" and finer connecting copper traces between them.

Rows 2, located at the edges of the Sensor, are constructed with the same "comb" pattern on one side, and continuous area on the other side, with the combined total areas of each of the "side" Rows 2 approximately equal to the total areas of every "regular" Row 3.

Columns are created from individual element 4, which are interconnected via the copper traces 31 on the separate layer (illustrated in FIG. 3 and FIG. 4).

The "fingers" on the Rows and Columns are interleaved on the Top Layer of the Sensors, allowing for operations with targets having only a small footprint.

The Sensor includes annular copper 1 around the electrodes, connected to ground potential in normal use. This acts as a shield and a sink for currents created by an Electro-Static Discharge (ESD) event, when the user's body acquires significant charge, and is discharged when the hand touches the Sensor. A non-conductive cover that provides galvanic isolation between the user's hand and the Sensor is omitted for clarity in FIGS. 1 through 4. Therefore, the most likely point of entry for the ESD is on the sides of the Sensor, and ESD will be absorbed by the copper 1 and directed to ground without causing any harm to the circuit.

The Sensor also includes a ground plane 30 on the Second Copper Layer that shields the sensing electrodes on the Top Layer from the circuits typically located on the bottom of the PCB. It is also desirable that the next Layer after the Second Copper Layer incorporates solid areas of copper connected to ground and located under Column traces 31. Using this method all of the sensing electrodes on the Top Copper Layer are electrostatically shielded from the rest of the circuits.

A ground plane 30 incorporates round areas 32 without copper that are used for vias 59 connecting the Rows 2 and 3 to the rest of the circuit.

An example composition of the Sensor's PCB is illustrated in FIG. 5. It shows four (4) separate Copper Layers 51, 52, 53, and 54; inter-layer isolator/dielectric and adhesive 55; and three types of connecting vias 56, 57, and 58. Via 59, although appearing dissimilar, is in fact the same as via 58, except it does not have any connections from the internal Copper Layers 52 and 53. Via 59 is created in the same PCB technological processing step as via 58.

Top layer 80 is shown, which is a non-conductive cover providing galvanic isolation of the layer 51. The isolator/dielectric layer 55A lies between the layer 51 and the layer 52. The isolator/dielectric layer 55B lies between the layer 52 and the layer 53. The isolator/dielectric layer 55C lies between the layer 53 and the layer 54.

The top layer 80 in FIG. 5 can also be termed a "cover layer". Layer 51 may be termed a "first layer" and can correspond to the first or "top copper layer" of FIGS. 1-4. Layer 52 may be termed a "second layer" and can correspond to the second or "internal copper layer" of FIGS. 1-4. Layer 53 or 54 may be termed a "third layer".

Returning to FIGS. 1 and 3, it will be appreciated that the number of rows can be eleven or more, and the number of columns can be thirteen or more.

Layers 51 and 52 are used for the Capacitive Touch Pad Sensor itself, and Layers 53 and 54 are normally used for the circuitry typically located on the bottom of the PCB.

It will be appreciated by a person skilled in the art that Copper Layer 53 (the next Layer after the Second Copper Layer) is mostly free for wiring except for the grounded areas under traces 31. This allows for easy routing of any circuitry located on the bottom of the PCB.

It is self evident that the minimum target footprint 5 (FIG. 2) for the current invention is much smaller then the minimum target footprint 74 (FIG. 7) for the Previous Art, under the condition that the spacing between the Rows/Columns for the current invention is the same as the spacing for the Previous Art implementation.

The invention claimed is:

1. A capacitive touch pad comprising cover and first layers,
    the cover layer comprising a non-conductive cover providing galvanic isolation of the first layer,
    the first layer comprising a plurality of row-shaped row-sensing electrodes and a row-by-column array of column-sensing electrodes,
    each column of column-sensing electrodes interconnected by conductive traces,
    the row-sensing electrodes and column-sensing electrodes defining interleaved combs therebetween,
    each column-sensing electrode overlapping at least two row-shaped, row-sensing electrodes,
    each comb comprising at least two fingers.

2. The capacitive touch pad of claim 1 wherein the fingers are no wider than eight mils.

3. The capacitive touch pad of claim 1 wherein the fingers define spaces therebetween, and the spaces are no wider than eight mils.

4. The capacitive touch pad of claim 1 further comprising a second layer, the first layer lying between the cover and second layers, the second layer comprising a ground plane.

5. The capacitive touch pad of claim 4 further comprising a third layer, the second layer lying between the first and third layers, the third layer bearing circuitry.

6. The capacitive touch pad of claim 1 wherein in the first layer further comprises annular copper around the electrodes.

7. The capacitive touch pad of claim 6 wherein the annular copper is connected to ground potential.

8. The capacitive touch pad of claim 4 further comprising an isolator/dielectric layer between the first and second layers.

9. The capacitive touch pad of claim 5 further comprising an isolator/dielectric layer between the second and third layers.

10. The capacitive touch pad of claim 1 wherein the number of rows is at least three and the number of columns is at least three.

11. The capacitive touch pad of claim 10 wherein the number of rows is at least eleven and the number of columns is at least thirteen.

12. A capacitive touch pad comprising cover and first layers,
    the cover layer comprising a non-conductive cover providing galvanic isolation of the first layer,
    the first layer comprising a plurality of row-shaped row-sensing electrodes and a row-by-column away of column-sensing electrodes,
    each column of column-sensing electrodes interconnected by conductive traces, the row-sensing electrodes and column-sensing electrodes defining interleaved combs therebetween,
    each column-sensing electrode overlapping at least two row-shaped, row-sensing electrodes,
    each comb comprising at least two fingers,
    the touch pad further comprising a second layer,
    the first layer lying between the cover and second layers,
    the second layer comprising a ground plane.

13. The capacitive touch pad of claim 12 further comprising a third layer,
    the second layer lying between the first and third layers,
    the third layer bearing circuitry.

14. A capacitive touch pad comprising cover and first layers,
    the cover layer comprising a non-conductive cover providing galvanic isolation of the first layer,
    the first layer comprising a plurality of row-shaped row-sensing electrodes and a row-by-column array of column-sensing electrodes,
    each column of column-sensing electrodes interconnected by conductive traces, the row-sensing electrodes and column-sensing electrodes defining interleaved combs therebetween,
    each column-sensing electrode overlapping at least two row-shaped, row-sensing electrodes, each comb comprising at least two fingers,
wherein in the first layer further comprises annular copper around the electrodes.

15. The capacitive touch pad of claim 14 wherein the annular copper is connected to ground potential.

16. The capacitive touch pad of claim 12 further comprising an isolator/dielectric layer between the first and second layers.

17. The capacitive touch pad of claim 13 further comprising an isolator/dielectric layer between the second and third layers.

18. A capacitive touch pad,
the touch pad defining top, bottom, left, and right edges,
the pad comprising cover and first layers,
the cover layer comprising a non-conductive cover providing galvanic isolation of the first layer,
the first layer comprising a plurality of row-shaped row-sensing electrodes each extending toward the left and right edges, and a row-by-column array of column-sensing electrodes,
each column of column-sensing electrodes interconnected by conductive traces,
the row-sensing electrodes and column-sensing electrodes defining interleaved combs therebetween,
each column-sensing electrode overlapping at least two row-shaped, row-sensing electrodes,
each comb comprising at least two fingers,
at least one regular row-shaped row-sensing electrode having fingers extending toward the top edge and having fingers extending toward the bottom edge,
at least one row of column-sensing electrodes having fingers extending toward the top edge and having fingers extending toward the top edge.

19. The capacitive touch pad of claim 18 wherein the fingers are no wider than eight mils.

20. The capacitive touch pad of claim 18 wherein the fingers define spaces therebetween, and the spaces are no wider than eight mils.

21. The capacitive touch pad of claim 18 further comprising a second layer,
the first layer lying between the cover and second layers,
the second layer comprising a ground plane.

22. The capacitive touch pad of claim 21 further comprising a third layer,
the second layer lying between the first and third layers,
the third layer bearing circuitry.

23. The capacitive touch pad of claim 18 wherein the first layer further comprises annular copper around the electrodes.

24. The capacitive touch pad of claim 23 wherein the annular copper is connected to ground potential.

25. The capacitive touch pad of claim 21 further comprising an isolator/dielectric layer between the first and second layers.

26. The capacitive touch pad of claim 22 further comprising an isolator/dielectric layer between the second and third layers.

27. The capacitive touch pad of claim 18 wherein the number of rows is at least three and the number of columns is at least three.

28. The capacitive touch pad of claim 27 wherein the number of rows is at least eleven and the number of columns is at least thirteen.

29. The capacitive touch pad of claim 18 wherein each of the column-sensing electrodes has fingers extending toward the top edge and has fingers extending toward the bottom edge.

* * * * *

UNITED STATES PATENT AND TRADEMARK OFFICE
CERTIFICATE OF CORRECTION

PATENT NO.       : 7,580,030 B2                                    Page 1 of 1
APPLICATION NO.  : 10/528512
DATED            : August 25, 2009
INVENTOR(S)      : Victor Marten It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Fourteenth Day of September, 2010

David J. Kappos
*Director of the United States Patent and Trademark Office*